United States Patent
Holzberg et al.

(10) Patent No.: US 9,707,929 B2
(45) Date of Patent: Jul. 18, 2017

(54) SENSOR UNIT FOR ACTUATING A VEHICLE DOOR IN A CONTACTLESS FASHION

(71) Applicant: Brose Fahrzeugteile GmbH & Co. KG, Hallstadt, Hallstadt (DE)

(72) Inventors: Frank Holzberg, Koenigsberg (DE); Karl Schneider, Besigheim (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 301 days.

(21) Appl. No.: 13/871,435

(22) Filed: Apr. 26, 2013

(65) Prior Publication Data
US 2013/0234828 A1    Sep. 12, 2013

Related U.S. Application Data

(63) Continuation of application No. PCT/EP2011/005317, filed on Oct. 21, 2011.

(30) Foreign Application Priority Data

Oct. 26, 2010  (DE) ......... 10 2010 049 400

(51) Int. Cl.
*B60R 25/01*    (2013.01)
*B60R 25/20*    (2013.01)
(Continued)

(52) U.S. Cl.
CPC .......... *B60R 25/01* (2013.01); *B60R 25/2054* (2013.01); *G07C 9/00944* (2013.01);
(Continued)

(58) Field of Classification Search
CPC . G07C 9/00944; B60R 25/01; B60R 25/2054; E05Y 2400/852; E05Y 2400/858;
(Continued)

(56) References Cited

U.S. PATENT DOCUMENTS

| 8,228,166 B2 | 7/2012 | Eberhard |
| 9,081,032 B2 | 7/2015 | Lange |

(Continued)

FOREIGN PATENT DOCUMENTS

| CN | 101010477 A | 8/2007 |
| CN | 103153717 A | 6/2013 |
| DE | 10 2004 041 709 B3 | 10/2005 |
| DE | 10 2009 017 404 A1 | 11/2009 |
| DE | 10 2008 063 366 A1 | 7/2010 |
| EP | 1 789 645 B1 | 12/2008 |
| JP | H 09-281963 A | 10/1997 |
| JP | 2005-133529 A | 5/2005 |
| JP | 2008-085701 A | 4/2008 |
| JP | 2008085701 A * | 4/2008 |

(Continued)

OTHER PUBLICATIONS

Japanese Office Action for Japanese Application No. 2013-535304 dated May 13, 2014—English translation.

(Continued)

*Primary Examiner* — Laura Nguyen
(74) *Attorney, Agent, or Firm* — Muncy, Geissler, Olds & Lowe, P.C.

(57) ABSTRACT

A sensor unit is provided that is not susceptible to errors for contactlessly actuating a vehicle door. The sensor unit includes a first proximity sensor and a second proximity sensor. Each of the two proximity sensors has an elongate detection field extending substantially in a Y direction. The detection fields of the two proximity sensors are spaced from one another in a direction perpendicular to the Y direction. In addition, the detection field of the first proximity sensor projects beyond the detection field of the second proximity sensor in the Y direction at least on one side by a projecting length.

7 Claims, 2 Drawing Sheets

(51) Int. Cl.
    *G07C 9/00*    (2006.01)
    *E05F 15/73*   (2015.01)
(52) U.S. Cl.
    CPC ......... *E05F 15/73* (2015.01); *E05Y 2400/852* (2013.01); *E05Y 2400/858* (2013.01); *E05Y 2900/546* (2013.01)
(58) Field of Classification Search
    CPC . E05Y 2900/546; E05F 15/2023; E05F 15/73
    See application file for complete search history.

(56)             References Cited

U.S. PATENT DOCUMENTS

| | | | |
|---|---|---|---|
| 2007/0205863 A1* | 9/2007 | Eberhard | ............ B60R 25/2036 |
| | | | 340/5.72 |
| 2008/0068145 A1 | 3/2008 | Weghaus et al. | |
| 2011/0118946 A1* | 5/2011 | Reimann | ............ B60R 25/2036 |
| | | | 701/49 |
| 2011/0276234 A1* | 11/2011 | Van Gastel | ............ E05B 81/78 |
| | | | 701/49 |
| 2013/0234733 A1 | 9/2013 | Lange | |

FOREIGN PATENT DOCUMENTS

| | | |
|---|---|---|
| WO | WO 2010/076332 A1 | 7/2010 |
| WO | WO 2012/052210 A1 | 4/2012 |

OTHER PUBLICATIONS

Chinese Office Action for Chinese Application No. 201180049844.X dated Apr. 30, 2015 with English translation.

* cited by examiner

SENSOR UNIT FOR ACTUATING A VEHICLE DOOR IN A CONTACTLESS FASHION

This nonprovisional application is a continuation of International Application No. PCT/EP2011/005317, which was filed on Oct. 21, 2011, and which claims priority to German Patent Application No. DE 10 2010 049 400.3, which was filed in Germany on Oct. 26, 2010, and which are both herein incorporated by reference.

BACKGROUND OF THE INVENTION

Field of the Invention

The invention relates to a sensor unit for actuating, i.e. for opening and/or closing, a vehicle door, in particular a tailgate, in a contactless fashion.

Description of the Background Art

For a user of a vehicle it is from time to time desirable to open or to close a vehicle door, in particular the tailgate of a trunk, in a contactless fashion. This is the case, for example, if the user uses both hands to carry an object such as, for example, a beer crate which is to be positioned in the vehicle's trunk.

At present, development work is being carried out on sensor units with proximity sensors which are arranged in the rear bumper of the vehicle and can detect a movement of the user's foot as a door opening request, whereupon a triggering signal for automatically opening (or else closing) the trunk is output by a control unit which is connected to the proximity sensors by signal technology. Such sensor units are frequently configured to output the triggering signal if the user extends his foot under the bumper.

It is desirable for such a sensor unit to be capable of reliably differentiating a specific characteristic movement of the foot, with which the door opening request is to be indicated, from other movements of the foot. For example, the sensor unit is to bring about the opening of the trunk if the vehicle driver carries out a kicking movement in the longitudinal direction of the vehicle under the bumper, while the opening process of the trunk is to fail to occur if the vehicle user moves his foot transversely with respect to the vehicles. This is intended to avoid, in particular, a situation in which the opening process of the trunk is triggered incorrectly if the user of the vehicle walks around the vehicle.

SUMMARY OF THE INVENTION

It is therefore an object of the invention to provide a sensor unit which has the purpose of actuating a vehicle door in a contactless fashion and is improved in terms of its susceptibility to faults.

Accordingly, a sensor unit for actuating a vehicle door of a vehicle in a contactless fashion is provided which comprises at least one first proximity sensor and at least one second proximity sensor. Each of the two proximity sensors has an elongated detection field which extends essentially in a Y direction. In the process, the detection field of the first proximity sensor projects beyond the detection field of the second proximity sensor at least on one side in the Y direction by a length denoted below as "excess distance". The detection fields of the at least two proximity sensors are preferably spaced apart from one another transversely with respect to the Y direction and in the process extend, in particular, approximately parallel to one another.

The term "detection field" denotes generally the measurement-sensitive surface of the respective proximity detector, that is to say that area within which the respective proximity sensor detects the approach of a vehicle user. The at least two proximity sensors are preferably embodied as capacitive proximity sensors. In this case, the detection field, or each detection field, is expediently a planar electrode by means of which an electrical field is irradiated into the surrounding space—in the manner typical for capacitive sensors—wherein this electrical field is influenced in a measurable fashion by the body tissues of a vehicle user if he approaches. However, it is also conceivable to embody one proximity sensor, or each of the proximity sensors, as an optical proximity sensor or ultrasonic proximity sensor. The detection field of the first proximity sensor is referred to below as a first detection field. The detection field of the second proximity sensor is correspondingly referred to below as a second detection field.

In an embodiment, the vehicle door which is to be opened is a tailgate. The sensor unit is expediently arranged here in its intended installation position in the rear bumper of the vehicle. In this case, the Y direction along which the detection fields of the at least two proximity sensors are aligned in their longitudinal extent is preferably oriented parallel to the transverse direction of the vehicle. However, the sensor unit according to the invention can also basically be used for opening other vehicle doors in a contactless fashion. In particular, in this case, the Y direction in the installation situation of the sensor unit can also assume a different orientation with respect to the vehicle. In any case, the proximity sensors are, however, preferably arranged near to the vehicle door to be opened.

The two further spatial axes which are perpendicular with respect to the Y direction and with respect to one another are referred to below as the X direction and the Z direction. In the preferred application in which the Y direction in the installation situation of the sensor unit is aligned parallel to the transverse direction of the vehicle, the X direction is aligned parallel to the longitudinal direction of the vehicle. In this case, the Z direction is correspondingly aligned vertically and therefore parallel with respect to the vertical axis of the vehicle.

As a result of the differently implemented longitudinal extent of the at least two detection fields it is ensured that various types of movements, in particular leg movements of a vehicle user in the space sensed by the proximity sensors are reflected in different ways in the signal profile generated by the first proximity sensor and/or second proximity sensor. By evaluating the signals which are generated by the at least two proximity sensors it is therefore possible to infer the type of movement which brings about the signal profile. In particular, in this context it is possible to differentiate precisely between a movement directed in the Y direction and a movement directed in the X or Z direction, as a result of which a door opening request of a vehicle user can be detected precisely and, at least virtually, without faults.

The suitability of the sensor unit for differentiating between various types of movement is basically already provided within the scope of the invention if the first detection field projects beyond the second detection field only one side. Improved sensitivity of the sensor unit for differentiating various types of movements is, however, achieved by means of a preferred embodiment of the sensor unit in which the first detection field projects beyond the second detection field at both ends. The excess distance of the first sensor field beyond the second sensor field can be different here at the two longitudinal ends. However, for reasons of symmetry, in particular in terms of a simplified evaluation capability of the sensor signals, the excess distance is preferably selected to be the same at both longitudinal ends of the detection fields. The first sensor field therefore preferably projects with both longitudinal ends approximately by the same length beyond the second sensor field.

It has proven particularly advantageous for precise and fault-free detection of a kicking movement which indicates a door opening request to select the excess distance in such a way that it corresponds to at least 5%, preferably to at least 10% of the length of the first detection field. However, the excess distance is preferably at maximum approximately 33% of the length of the first detection field. Given an exemplary length of the first detection field of approximately 80 cm, the first detection field projects, for example, approximately 10 cm beyond the second detection field.

In an installation situation of the sensor unit in a vehicle, the longer first detection field is preferably arranged above the shorter second detection field. However, it is basically also possible to arrange the first detection field underneath the second detection field.

In an embodiment of the invention, the sensor unit additionally comprises a control unit which evaluates signals of the proximity sensors and outputs a triggering signal which brings about the actuation of the vehicle door if it detects, on the basis of the evaluated sensor signals, a movement which indicates a door opening request of a vehicle user.

The control unit, which in an embodiment comprises a microprocessor with control software implemented therein, is designed here, in terms of circuitry and/or programming, to detect at least one time offset between the respective signals of the two proximity sensors and to output the triggering signal if the time offset or each detected time offset meets a predefined triggering criterion.

In an embodiment of the invention, the triggering criterion is predefined here to the effect that the control unit triggers the triggering signal only if the time offset or each time offset undershoots a respectively assigned maximum value. In an exemplary embodiment, this maximum value is defined empirically, in particular on the basis of series of trials, in such a way that given a typical kicking movement of a vehicle user in the X direction the triggering criterion is met, while given a leg movement in the Y direction the triggering condition is not met. However, it is also basically possible to predefine the triggering criterion in such a way that it is not met in the case of a typical kicking movement of a vehicle user in the X direction, while it is met in the case of a leg movement in the Y direction.

In order to prevent incorrect triggering of the sensor unit by unauthorized persons or, for example, by animals, the sensor unit is preferably coupled to a fully automatically opening door locking system ("keyless go") which enables opening of the vehicle door only if the door locking system is, for example, released by a radio key of the vehicle user.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Corresponding parts and variables are always provided with the same reference symbols in all the figures.

Figure 1:
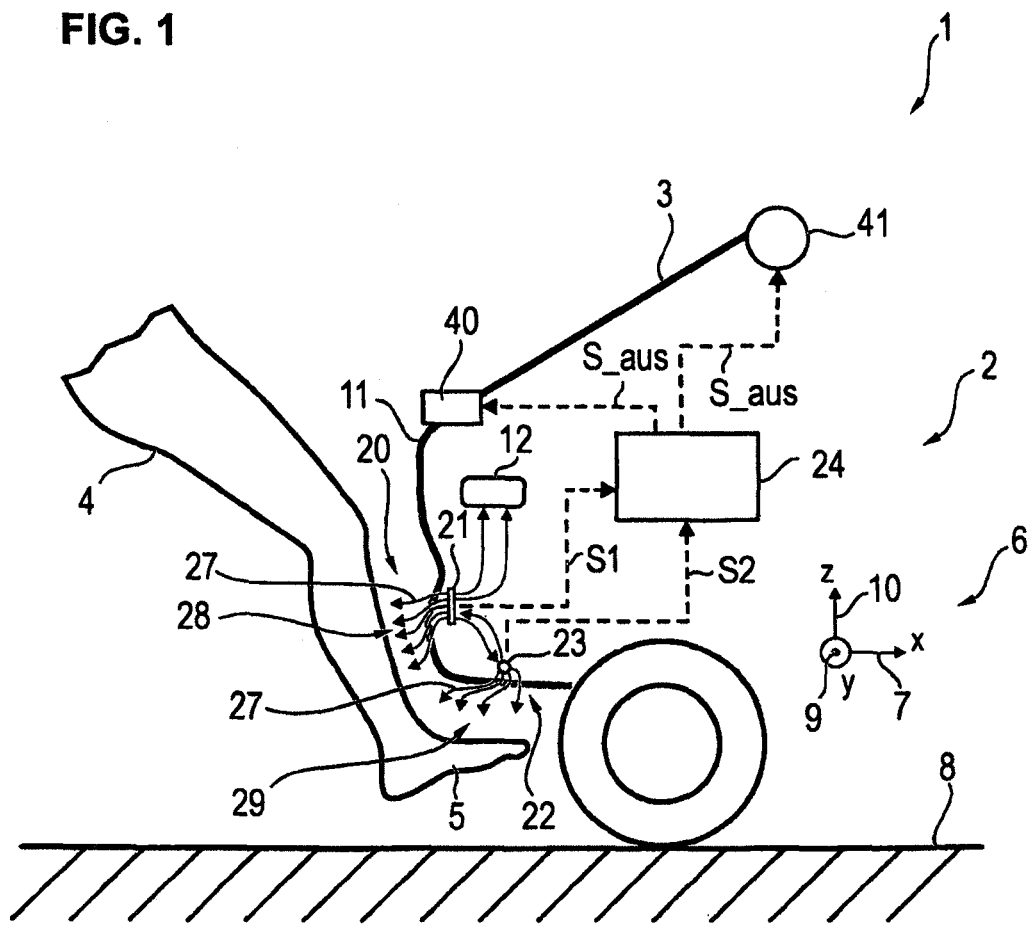
FIG. 1 shows a highly schematic side view of a rear part of a motor vehicle which is provided with a sensor unit for actuating a tailgate in a contactless fashion, and a leg of an approaching vehicle user.

FIG. 1 shows a rear section of a motor vehicle 1 which is provided with a sensor unit 2 for actuating a vehicle door, here a tailgate 3, in a contactless fashion. In addition, a leg 4 of a vehicle user is illustrated who intends to open the tailgate 3 by moving his leg 4 and the associated foot 5.

Furthermore, in FIG. 1 a Cartesian coordinate system 6 is illustrated which is used to define the intended installation and the intended actuation of the sensor unit 2. In this context, an X direction 7 of the coordinate system 6 is aligned parallel to an underlying surface 8 on which the motor vehicle 1 is standing, and said X direction 7 points essentially in the longitudinal direction of the motor vehicle 1; a Y direction 9 is also aligned parallel to the underlying surface 8 and points in the transverse direction of the motor vehicle 1 (out of the plane of the drawing); and finally a Z direction 10 of the coordinate system 6 is located perpendicularly with respect to the underlying surface 8.

The motor vehicle 1 comprises a rear bumper 11 which is attached essentially to a transverse carrier 12 of the vehicle bodywork.

The sensor unit 2 comprises a first capacitive proximity sensor 20 with a first detection field in the form of a measuring electrode 21 which is embodied as an elongate metal foil. The sensor unit 2 also comprises a second capacitive proximity sensor 22 with a second detection field in the form of a measuring electrode 23 which is embodied as an elongate wire. Furthermore, the sensor unit 2 comprises a control unit 24 which is formed essentially by a microcontroller with control software implemented therein.

Both measuring electrodes 21, 23 are mounted on a lower region of the bumper 11, wherein the two measuring electrodes 21, 23 are spaced apart from one another both in the Z direction 10 and in the X direction 7. In this context, the measuring electrode 21 is arranged above the measuring electrode 23 and closer to the rear side of the vehicle than the latter.

Figure 2:
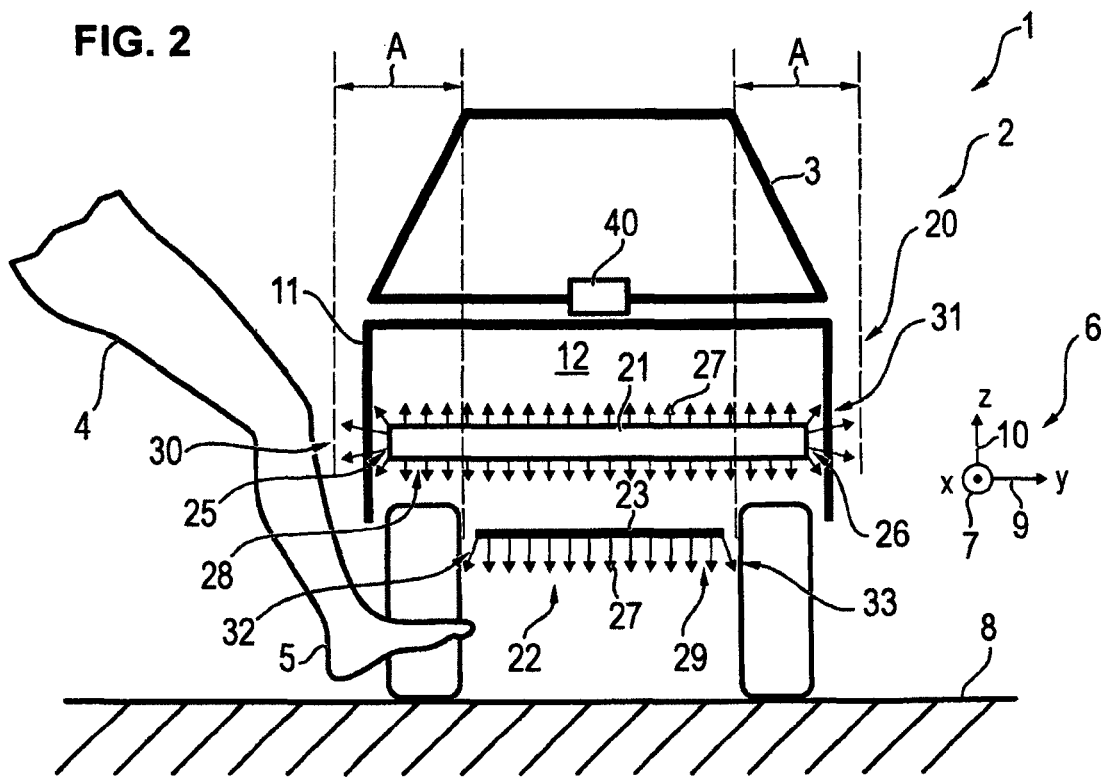
FIG. 2 shows a schematic rear view of the motor vehicle, the sensor unit according to FIG. 1 and again the leg of the vehicle user.

FIG. 2 illustrates the motor vehicle 1 in a view in the X direction 7 looking onto the rear side of the vehicle. As is apparent from this illustration, the first measuring electrode 21 projects symmetrically with its two longitudinal ends 25, 26 over the second measuring electrode 23 in Y direction 9 and in doing so extends over a large part of the width of the motor vehicle 1. For example, the measuring electrode 21 has a length of approximately 80 cm while the second measuring electrode 23 has a length of approximately 60 cm, with the result that the measuring electrode 21 protrudes at both ends by an excess distance A of approximately 10 cm beyond the measuring electrode 23.

During operation an electrical voltage is applied to the measuring electrodes 21, 23, under the effect of which voltage each of the proximity sensors 20, 22 generates an electrical field in a spatial volume (referred to below as sensed space 28, 29) which is located in front of the measuring electrodes 21, 23. The electrical field which is respectively generated by the measuring electrodes 21 and 23 is indicated by field lines 27 in FIGS. 1 and 2. As is apparent from FIGS. 1 and 2, the sensed space 28 of the proximity sensor 20 is located on the outside in front of the rear side of the bumper 11 essentially in the X direction, while the sensed space 29 of the proximity sensor 22 is located along the edge of the bumper 11, essentially on the underside in the Y direction.

A body part, in particular a leg of a vehicle user, which is located in the respective sensed space 28, 29 acts with the underlying surface as an opposing electrode to the measuring electrode 21, 23 owing to the electrical conductivity of the human body tissue and the grounding of the body tissue. Each of the measuring electrodes 21, 23 therefore forms with the body part an (electric) capacitor whose capacitance changes in a characteristic way with the distance of the body part from the respective measuring electrode 21, 23.

In order to detect a door opening request of a vehicle user, the control unit 24 picks up signals S1, S2 of the proximity sensors 20, 22 which contain information about the presence of a body part in the sensed space 28 and 29, respectively. In one preferred embodiment, the control unit 24 senses the electrical voltage which is respectively present at the measuring electrodes 21, 23 and the current respectively flowing across the measuring electrodes 21, 23. The control unit 24 calculates from these current values and voltage values a capacitance measure which is formed between the respective measuring electrode 21 or 23 and the ground and which is either the capacitance itself or a measurement variable which correlates thereto. The calculated capacitance measures are converted by the control unit 24, by comparison with a stored threshold value, into the (step) signals S1 and S2 which assume the value "1" if a body part of a vehicle user is located in the sensed space of the respective proximity sensor 20, 22 and which assume the value "0" in the absence of such a body part. As a result of temporary movement of a leg of the vehicle user into the sensed space 28, 29 of one of the proximity sensors 20, 22, a signal pulse is therefore generated in the respective signal S1 and S2 whose rising edge indicates that the leg penetrates into the sensed space 28, 29 and the falling edge thereof indicates that the is withdrawn from the sensed space 28, 29.

Figure 3:
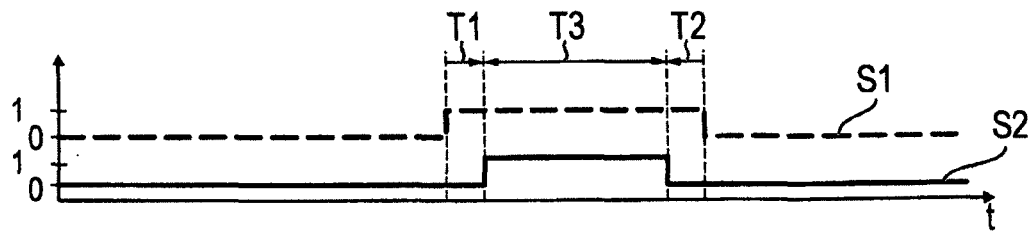
FIG. 3 shows a time profile of the signals generated by two capacitive proximity sensors of the sensor unit, in each case during a foot movement in the longitudinal direction of the vehicle.
Figure 4:
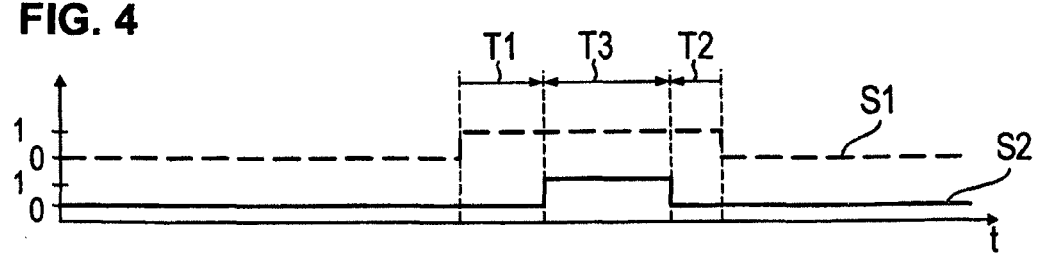
FIG. 4 shows an illustration according to FIG. 3 of the time profile of the signals generated by the two proximity sensors during a foot movement in the transverse direction of the vehicle.

In FIG. 3 and FIG. 4, the typical profile of the signals S1 and S2 of the two measuring electrodes 21 and 23 is illustrated plotted against the time t in the form which is obtained for a kicking movement of the vehicle user, i.e. a leg movement in the X direction (FIG. 3) or for a sideways movement, i.e. a leg movement in the Y direction. In one exemplary embodiment of the sensor unit 2, the kicking movement is intended to indicate a door opening request of the vehicle user and to correspondingly trigger the opening of the tailgate 3, while the sideways movement is not intended to trigger opening of a door.

It is characteristic of both signal profiles here that a leg movement results in chronologically correlating signal pulses in both signals S1 and S2. The signal pulse in the signal S1 is chronologically wider here than the signal pulse in the signal S2 and therefore encloses the latter chronologically, especially since the leg always penetrates the sensed space 28 earlier than the sensed space 29, and also leaves the latter later again when the leg is withdrawn. A certain time offset T1 is therefore always formed between the rising edges of the signals S1 and S2. Correspondingly, a time offset T2 is also formed between the trailing edges of the signals S1 and S2.

In the case of the kicking movement, which forms the basis of the signal profile according to FIG. 3, this time offset T1, T2 is comparatively small and is determined essentially by the offset of the proximity sensors 20 and 22 in the X direction. The time offset T1 and T2 is also largely symmetrical during the forward and rearward movements of the leg. The values of the time offset T1 of the rising edge and the values of the time offset T2 of the falling edge are therefore approximately of equal size.

In the case of the sideways movement, which forms the basis of the signal profile according to FIG. 4, the time offset T1, T2 is additionally determined by the different length of the proximity sensors 20 and 22. The time offset T1, T2 is as a result generally asymmetrical, wherein at least one time offset T1 or T2, in FIG. 4 for example the time offset T1, assumes a significantly larger value than in the case of a kicking movement.

In order to differentiate a kicking movement automatically from a sideways movement and therefore to detect a door opening request in a failsafe fashion, the control unit 24 determines the time offset T1 and the time offset T2 for the signals S1 and S2 and compares the resulting time offset values with respectively stored threshold values.

Insofar as the control unit 24 does not detect that the threshold value is exceeded either the time offset T1 or for the time offset T2, said control unit 24 outputs a triggering signal Sa to an electromechanical lock 40 of the tailgate 3, and to an electric motor 41 which is assigned to the tailgate 3, with the result that the tailgate 3 is opened automatically by the electric motor 41.

If this triggering criterion is not met, i.e. if it is detected that the threshold value is exceeded either for the time offset T1 or for the time offset T2, the control unit 24 does not output the triggering signal Sa. As a result, the tailgate 3 remains closed, in particular if the vehicle user moves his leg sideways under the bumper 11.

The sensor unit 2 itself is expediently activated in the mounted state by a fully automatically opening door locking system ("keyless go") if the latter detects the approaching of the vehicle 1 by the vehicle user, for example as a result of radio contact with an RFID transponder in the car key of the vehicle user. In this way, the sensor unit is operated in an energy-saving fashion only if the vehicle user is actually located in the direct vicinity of the vehicle 1. At the same time, unauthorized persons are in this way easily prevented from being able to open the tailgate 3.

For further improved detection of the door opening request, in one optional configuration the control unit 24 additionally senses the time period T3 between the end of the time offset T1 and the start of the time offset T2 as a measure of the pulse length and compares this time period T3 with a further stored threshold value. Within the scope of a refined triggering criterion, the control unit 24 outputs the triggering signal Sa in this context only if the time period T3 additionally undershoots the respective threshold value. As a result, the rapid kicking movement which is prescribed to indicate the door opening request is differentiated from other leg movements during which the vehicle user pushes a leg in the X direction under the bumper 11 and does not pull it back again in the X direction until after a relatively long time, for example when de-icing ("scraping") the rear windscreen, or cleaning it in some other way, when loading a roof rack or rear mounted rack or during similar activities.

Instead of the electric motor 41, a spring unit can also be provided which opens the tailgate 3 under the effect of an elastic restoring force. In this case, the control unit 24 transmits the triggering signal Sa only to the lock 40, which subsequently releases the tailgate 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor unit for actuating a vehicle door of a vehicle in a contactless fashion, the sensor unit comprising:
   a first proximity sensor;
   a second proximity sensor,
      wherein the first and second proximity sensors have an elongated detection field that extends essentially in a Y direction,
      wherein the detection field of the first proximity sensor projects beyond the detection field of the second proximity sensor at least on one side in the Y direction by an excess distance, and
      wherein the detection field of the first proximity sensor is arranged above the detection field of the second proximity sensor, and
   a control unit configured to evaluate signals of the first and second proximity sensors and configured to output a triggering signal that brings about an actuation of the vehicle door,
      wherein the control unit is configured to detect a first time offset between rising edges of the respective signals of the first and second proximity sensors and a second time offset between falling edges of the respective signals of the first and second proximity sensors, compare both the first and second time offsets with respectively assigned threshold values, and output the triggering signal only if neither the first time offset nor the second time offset overshoots the respectively assigned threshold values.

2. The sensor unit as claimed in claim 1, wherein the detection field of the first proximity sensor projects beyond the detection field of the second proximity sensor in the Y direction at both ends by approximately a same excess distance in each case.

3. The sensor unit as claimed in claim 1, wherein the excess distance is at least 5% or at least 10% of the length of the first proximity sensor in the Y direction.

4. The sensor unit as claimed in claim 1, wherein the first and second proximity sensors are arranged on or in a rear bumper of the vehicle.

5. The sensor unit as claimed in claim 1, wherein the first and second proximity sensors are capacitive proximity sensors.

6. A vehicle comprising a vehicle door, in particular a tailgate, and a sensor unit as claimed in claim 1 for actuating the vehicle door in a contactless fashion.

7. A method for actuating a vehicle door in a contactless fashion via a sensor unit as claimed in claim 1,
   wherein, a first time offset is detected between rising edges of respective signals of the first and second proximity sensors and a second time offset is detected between falling edges of the respective signals of the first and second proximity sensors,
   wherein the first and second time offsets are compared with respectively assigned threshold values, and
   wherein a triggering signal, which brings about the actuation of the vehicle door, is output only if neither the first time offset nor the second time offset overshoots the respectively assigned threshold values.

* * * * *